(12) United States Patent
Gerke et al.

(10) Patent No.: US 8,668,249 B2
(45) Date of Patent: Mar. 11, 2014

(54) FRAME FOR A CAB OF A MOBILE MACHINE

(75) Inventors: Clifton Robert Gerke, Peoria, IL (US); Dominick Brian Rivara, Peoria, IL (US); Kent Michael Levy, Peoria, IL (US); Donald Lemont Stamets, Bloomington, IL (US)

(73) Assignee: Caterpillar Inc., Peoria, IL (US)

( * ) Notice: Subject to any disclaimer, the term of this patent is extended or adjusted under 35 U.S.C. 154(b) by 372 days.

(21) Appl. No.: 12/975,671

(22) Filed: Dec. 22, 2010

(65) Prior Publication Data
US 2012/0161474 A1    Jun. 28, 2012

(51) Int. Cl.
*B62D 33/06* (2006.01)

(52) U.S. Cl.
USPC ..................... 296/190.08; 296/205

(58) Field of Classification Search
USPC ............................. 296/190.08, 205
See application file for complete search history.

(56) References Cited

U.S. PATENT DOCUMENTS

| 6,092,865 A * | 7/2000 | Jaekel et al. .................. 296/205 |
| 6,183,013 B1 | 2/2001 | Mackenzie et al. |
| 6,769,178 B1 | 8/2004 | Beckman |
| 6,948,768 B2 | 9/2005 | Corcoran et al. |
| 7,163,241 B2 | 1/2007 | Liu et al. |
| 7,222,913 B2 | 5/2007 | Womack et al. |

| 2002/0079721 A1 | 6/2002 | Colliar et al. |
| 2004/0232731 A1 | 11/2004 | Corcoran et al. |
| 2005/0274017 A1 | 12/2005 | Corcoran et al. |
| 2008/0084054 A1 | 4/2008 | Liesaus et al. |
| 2009/0315364 A1 | 12/2009 | Stojkovic et al. |

FOREIGN PATENT DOCUMENTS

| EP | 1325988 | 7/2003 |
| EP | 2154295 | 2/2010 |
| JP | 2004345486 | 12/2004 |

OTHER PUBLICATIONS

Coq, M. et al, "Introduction and state of the art of hydroforming," Virginia Commonwealth University, 2008, Woodhead Publishing Limited, pp. 1-13.

* cited by examiner

*Primary Examiner* — Joseph Pape
(74) *Attorney, Agent, or Firm* — Finnegan, Henderson, Farabow, Garrett & Dunner LLP

(57) ABSTRACT

A frame for a cab of a mobile machine includes first and second primary tubes, formed by hydroforming, connected to first and second secondary tubes. The first primary tube includes first and second about vertically extending portions and an about horizontally extending portion. The about vertically extending portions are configured to be connected to the mobile machine, and the about horizontally extending portion is disposed between the about vertically extending portions. The second primary tube includes first and second about vertically extending portions and an about horizontally extending portion. The about vertically extending portions of the second primary tube are configured to be connected to the mobile machine, and the about horizontally extending portion of the second primary tube is disposed between the about vertically extending portions of the second primary tube.

18 Claims, 6 Drawing Sheets

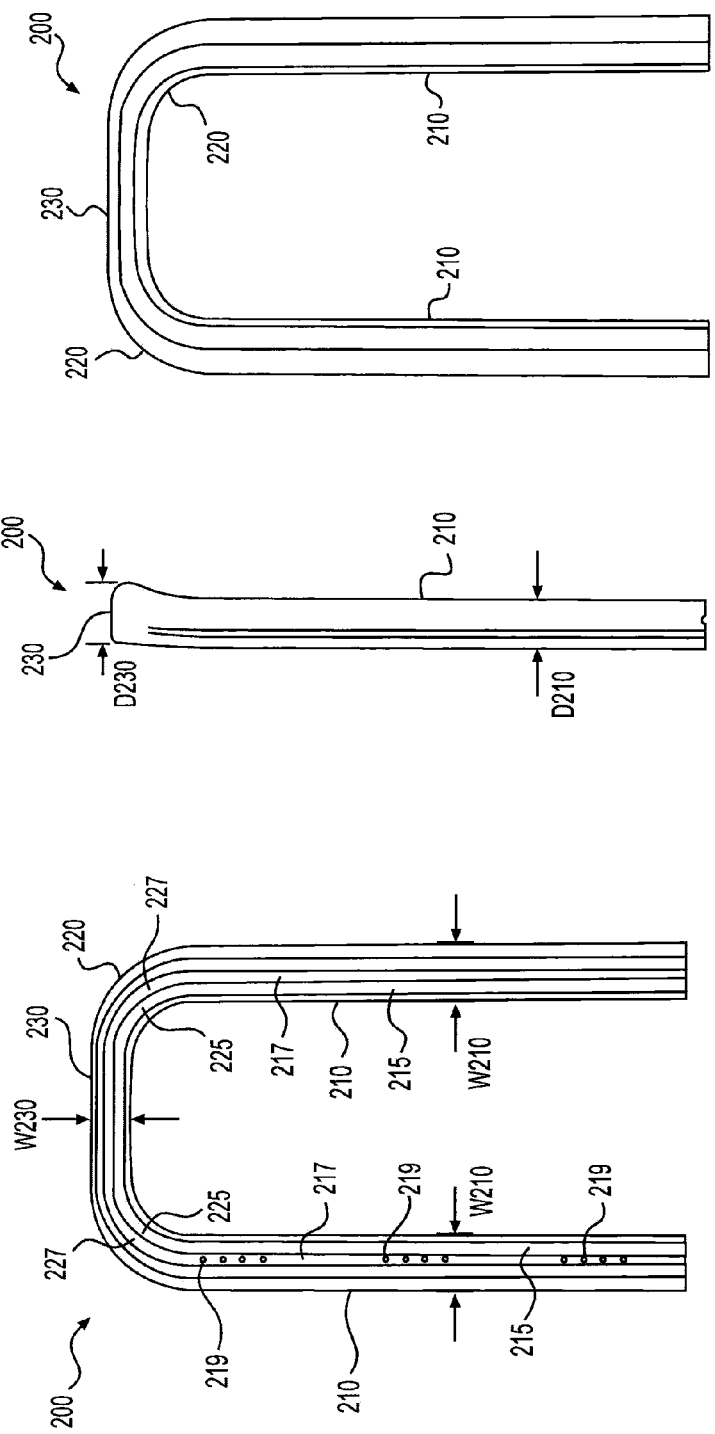

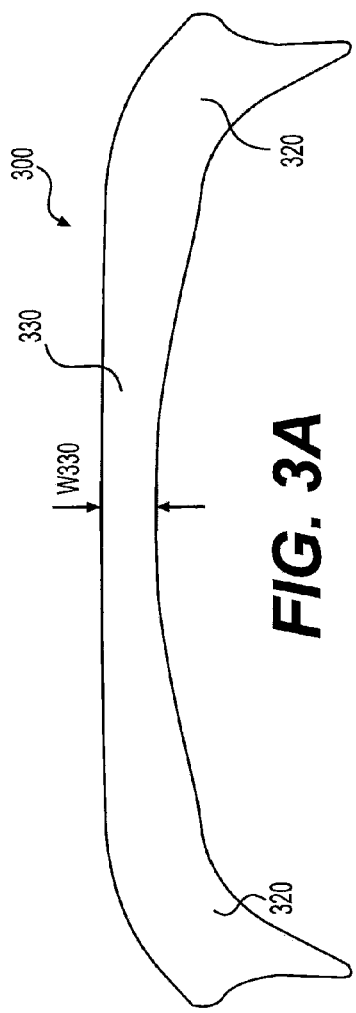
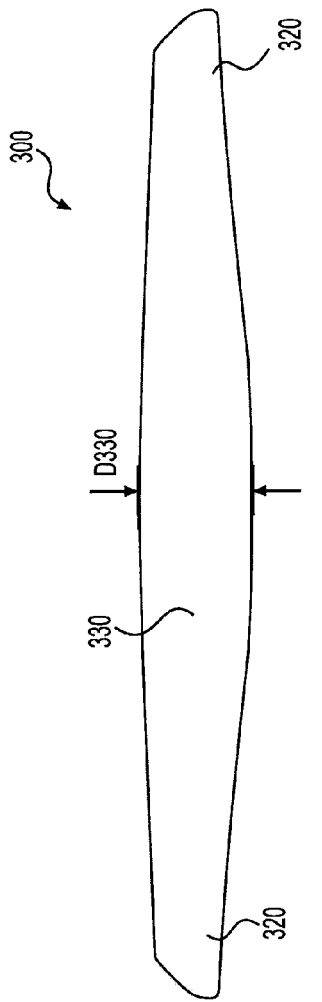
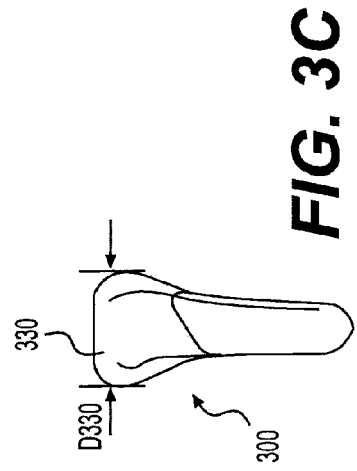

FRAME FOR A CAB OF A MOBILE MACHINE

TECHNICAL FIELD

The disclosure is related to a frame for a cab of a mobile machine, and more particularly to the cab frame that includes an integrated rollover protective structure (ROPS).

BACKGROUND

A mobile machine, such as an earthmoving machine, an excavation-type machine, a mining machine, or the like, may be employed for an earthmoving, excavation, mining, or other operation. The mobile machine may employ large earthmoving, excavating, drilling, or mining equipment, which is configured to dig and/or load earthen material from a worksite, to one or more large off-road haulage units, such as off-highway trucks that may be driven by a driver or autonomously or semi-autonomously controlled.

In many cases, the mobile machine is driven and/or otherwise operated by a person who sits in a cabin or cab that is connected to the machine. Often, the frame of the cab includes an integrated rollover protective structure (ROPS). As its name describes, the purpose of the ROPS is to provide a structure that may prevent the cab frame and the cab from being crushed in a rollover.

Often times, the cab frame is constructed from numerous hollow metal tubes. Each individual tube is generally straight and has a constant cross section. Tubes of different lengths, having different interior and/or different exterior dimensions, are used. In many cases, the cab frame is made up of dozens of these separate, differently-sized tubes. The tubes are welded together in different orientations relative to one another, to produce the desired shape of the cab frame, as well as to provide the cab frame with portions meeting different dimensional and strength requirements. It is a time-consuming, labor-intensive, and expensive process to weld all of the tubes to produce the cab frame. Further, in order for the cab frame to be strong enough so that it may provide protection to the person in the cab during a rollover, gussets are used to strengthen the weld joints that are formed between (i) generally vertically-extending tubes that are used to define the front, back, and sides of the cab, and (ii) generally horizontally-extending tubes that are used to define the roof and floor of the cab. Welding the gussets to the metal tubes is also time-consuming, labor-intensive, and expensive. Still further, the gussets block access to the corners of the cab frame, where it would otherwise be convenient to run electrical harnesses and ducting.

SUMMARY

In accordance with the disclosure, there is provided a frame for a cab of a mobile machine. The cab frame includes first and second primary tubes, formed by hydroforming, which are connected to first and second secondary tubes. The first primary tube includes first and second about vertically extending portions and an about horizontally extending portion. The about vertically extending portions are configured to be connected to the mobile machine, and the about horizontally extending portion is disposed between the about vertically extending portions. The second primary tube includes first and second about vertically extending portions and an about horizontally extending portion. The about vertically extending portions of the second primary tube are configured to be connected to the mobile machine, and the about horizontally extending portion of the second primary tube is disposed between the about vertically extending portions of the second primary tube.

Also in accordance with the disclosure, there is provided a frame for a cab of a mobile machine that includes a first primary tube having first and second about vertically extending portions and an about horizontally extending portion disposed therebetween. The first primary tube has different strengths along a length thereof and forms a left side of the cab frame. The first primary tube is formed by hydroforming. The cab frame further includes a second primary tube having first and second about vertically extending portions and an about horizontally extending portion disposed therebetween. The second primary tube has different strengths along a length thereof and forms a right side of the cab frame. The second primary tube is also formed by hydroforming. First and second secondary tubes are connected to the primary tubes.

Still further in accordance with the disclosure, there is provided a method of manufacturing a frame for a cab of a mobile machine. The method includes forming a first primary tube by a hydroforming operation, the first primary tube configured to form a left side of the cab frame. A second primary tube is formed by a hydroforming operation, the second primary tube configured to form a right side of the cab frame. First and secondary tubes are connected to both of the first and second primary tubes.

BRIEF DESCRIPTION OF THE DRAWINGS

FIG. 2A is a front view of a primary tube of the cab frame of FIG. 1.

FIG. 2B is a side view of the primary tube of FIG. 2A.

FIG. 2C is a back view of the primary tube of FIG. 2A.

FIG. 2D is a bottom view of the primary tube of FIG. 2A.

FIG. 3A is a front view of a secondary tube of the cab frame of FIG. 1.

FIG. 3B is a top view of the secondary tube of FIG. 3A.

FIG. 3C is a side view of the secondary tube of FIG. 3A.

DETAILED DESCRIPTION

Figure 1:
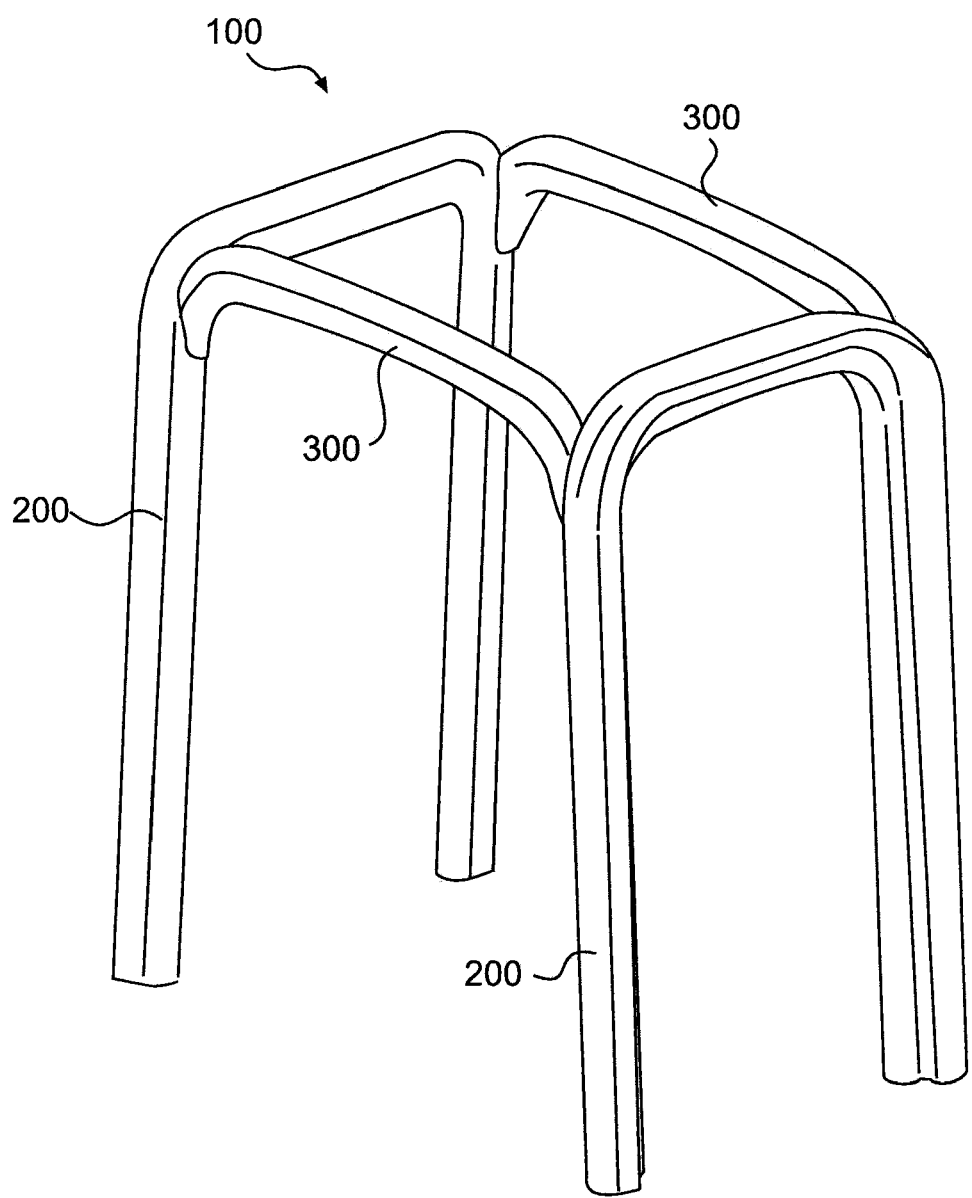
FIG. 1 is an isometric view of a frame of a cab for a mobile machine, in accordance with the disclosure.

FIG. 1 is an isometric view of a frame of a cabin or cab for a mobile machine, in accordance with the disclosure. It is contemplated that cab frame 100 may be connected to any type of mobile machine, such as but not limited to an earthmoving machine, an excavation-type machine, a mining machine, or the like, which may (but need not) be employed for an earthmoving, excavation, mining, or other operation. Such a mobile machine may (but need not) employ large earthmoving, excavating, drilling, or mining equipment, which is configured to dig and/or load earthen material from a worksite, to one or more large off-road haulage units, such as off-highway trucks that may be driven by a driver or autonomously or semi-autonomously controlled. It is further contemplated that the cab frame may (but need not) have connected thereto one or more of a front wall, a back wall, a left-side wall, a right-side wall, a roof, a windshield, a rear window, one or more side windows, one or more doors, or any other cab-defining structure, to thereby define either an open cab, an at-least-partially-closed cab, or a fully-closed cab, in which a person may sit to drive and/or otherwise operate the mobile machine. It is still further contemplated that cab frame 100 may include an integrated rollover protective structure (ROPS), which may prevent the cab frame and/or any cab-structure connected to the cab frame from being crushed in a rollover.

As shown in FIG. 1, cab frame 100 may include two (2) primary tubes 200 and two (2) secondary tubes 300, which may be connected to one another to form a complete frame on which the cab for the mobile machine may be built. It is contemplated that primary tubes 200 and secondary tubes 300 may be welded to one another. It is to be understood, however, that primary tubes 200 and secondary tubes 300 may be connected to one another by any other procedure, such as by bolting. FIGS. 2A-2D are front, side, back, and bottom views, respectively, of one of the primary tubes 200.

One of the primary tubes 200 used in cab frame 100 is now discussed. The other primary tube 200 used in cab frame 100 may, but need not, be substantially identical. As shown in the figures, primary tube 200 may be a hollow tube. Contours of primary tube 200 may be formed by a hydroforming operation. Specifically, during the hydroforming operation, a hollow structure, such as a straight tube that has a constant circular cross section, may be held in a mold, and a pressurized fluid (i.e., liquid or gas) may be flowed through the interior of the hollow structure. The mold may have the contours of primary tube 200 shown in FIGS. 2A-2D. As a result, the hollow structure may be plastically deformed and may take on the shape of the mold. Through this operation, primary tube 200 may be formed in a single manufacturing step. The mold may also form one or more openings along the length of primary tube 200, to permit the fluid to flow out of the hollow interior of primary tube 200 after the hydroforming operation.

Primary tube 200 includes two (2) about vertically extending portions 210 that are connected through two (2) curved portions 220 to about horizontally extending portion 230. Each of portions 210 and 230 may be about straight, and may be disposed about perpendicular to one another. For each portion 210, width W210 may be about constant along an about entire length of portion 210, while for portion 230, width W230 may vary (i) from a maximum at the ends that connect to portions 210 through curved portions 220 (ii) to a minimum at an about center of portion 230. Further, the value of the width W210 of each of portions 210 may be greater than a minimum value of the width W230 of portion 230. As shown in the drawings, the width W210 may be measured in a direction that extends from an inside to an outside edge of portion 210. As also shown in the drawings, the width W230 may be measured in a direction that extends from a top to a bottom edge of portion 230.

For each portion 210, depth D210 may be about constant along an about entire length of portion 210, while for portion 230, depth D230 may vary (i) from a minimum at the ends that connect to portions 210 through curved portions 220 (ii) to a maximum at an about center of portion 230. Further, the value of the depth D210 of each of portions 210 may be less than a maximum value of the depth D230 of portion 230. As shown in the drawings, the depth D210 may be measured in a direction that extends from a front to a back side of portion 210. As also shown in the drawings, the depth D230 may be measured in a direction that extends from a front to a back side of portion 230. The widths and/or the depths of each of the two (2) curved portions 220 may be chosen to transition from the widths and/or depths of portion 210 to the widths and/or depths of portion 230, respectively.

Each of portions 210 may define surface 215 and surface 217. Each surface 215 may be an about flat surface, and may lie in a flat plane. Each surface 217 may be an about flat surface, and may be disposed at an angle relative to surface 215, and the angle may be variable or may be about constant along the about entire length of portion 210. By disposing surface 215 at an angle relative to surface 217, primary tube 200 may resist bending in multiple directions or along multiple axes. Further, surfaces 215 for each of the two (2) portions 210 may lie within the same flat plane.

Similarly, portion 220 may define surface 225 and surface 227, where surface 225 may be an about flat surface and may lie in a flat plane, and surface 227 may be an about flat surface and may be disposed at an angle relative to surface 225, where the angle may be variable or may be about constant along the about entire length of portion 220. Further, surface 225 may lie within the same flat plane in which surfaces 215 of each of the two (2) portions 210 lie. In other words, surfaces 215 and 225 may define and lie within the same flat plane. Additionally or alternately, portion 230 may define surface 235 and surface 237, where surface 235 may be an about flat surface and may lie in a flat plane, and surface 237 may be an about flat surface and may be disposed at an angle relative to surface 235, where the angle may be variable or may be about constant along the about entire length of portion 230. Further, surface 235 may lie within the same flat plane in which surfaces 215 of each of the two (2) portions 210 lie. In other words, surfaces 215, 225, and 235 may define and lie within the same flat plane. By disposing surfaces 225 and 235 at one or more angles relative to surfaces 227 and 237, respectively, primary tube 200 may resist bending in multiple directions or along multiple axes. Each of the angles between (i) surfaces 215 and 217, (ii) surfaces 225 and 227, and (iii) surfaces 235 and 237 may be the same angle, or may be different angles.

As shown in the figures and as discussed above, cab frame 100 may include two (2) primary tubes 200. It is contemplated that primary tubes 200 may be disposed on the mobile machine such that: one of the primary tubes 200 defines a left side of cab frame 100 and of any cab-structure connected thereto, such as a left-side wall of the cab; the other one of the primary tubes 200 defines a right side of cab frame 100 and of any cab-structure connected thereto, such as a right-side wall of the cab; and any front or back walls of the cab are connected between the two (2) primary tubes 200. By this arrangement, for example, a door on the left side of the cab may connect to one of the primary tubes 200 (referred to here as left-side tube 200), and may close against each of (i) surfaces 215 of each of the two (2) portions 210 of left-side tube 200, (ii) surface 225 of curved portion 220 of left-side tube 200, and (iii) surface 235 of portion 230 of left-side tube 200. Similarly, a door on the right side of the cab may connect to the other one of the primary tubes 200 (referred to here as right-side tube 200), and may close against each of (i) surfaces 215 of each of the two (2) portions 210 of right-side tube 200, (ii) surface 225 of curved portion 220 of right-side tube 200, and (iii) surface 235 of portion 230 of right-side tube 200. It is to be understood that a door or doors may be connected to either or both of left-side or right-side tube 200, or that a door may be entirely omitted from any cab built on cab frame 100.

When a door is to be used on either or both of left-side tube 200 or right-side tube 200, the corresponding primary tube 200 may include one or more sets of holes 219 configured to receive screws, bolts, or other fasteners that connect one or more door hinges to cab frame 100. Holes 219 may be formed in surface 217 of at least one of the two (2) portions 210. Holes 219 may be formed during the hydroforming operation that produces primary tube 200, or may be formed after production of primary tube 200. Further, when holes 219 are formed during the hydroforming operation that produces primary tube 200, holes 219 may be formed in surface 217 of each of the two (2) portions 210 of primary tube 200. By this arrangement, a door may be mounted to either portion 210 (i.e., on either side) of primary tube 200. Alternately or additionally, although not shown in the drawings, one or more sets of holes may be formed in surface 215 of either or both of the two (2) portions 210.

The shape and/or contours of the extreme ends of primary tube 200 may be configured for connection of cab frame 100 to the mobile machine. Specifically, each of the two (2) primary tubes 200 may have ends suitable to be welded to the mobile machine. It is to be understood, however, that either or both of primary tubes 200 may be connected to the mobile machine by another procedure, such as by bolting.

As shown in FIG. 1, cab frame 100 may also include two (2) secondary tubes 300 that are connected to the two (2) primary tubes 200. FIGS. 3A-3C are front, top, and side views, respectively, of one of the secondary tubes 300.

Figure 4A:
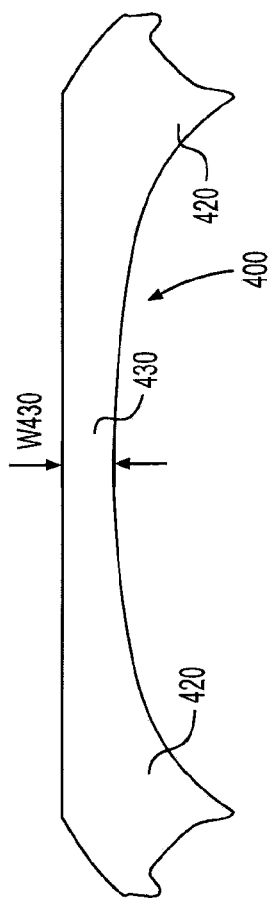
FIG. 4A is a front view of an alternate secondary tube that may be used in the cab frame of the mobile machine, in accordance with the disclosure.
Figure 4B:
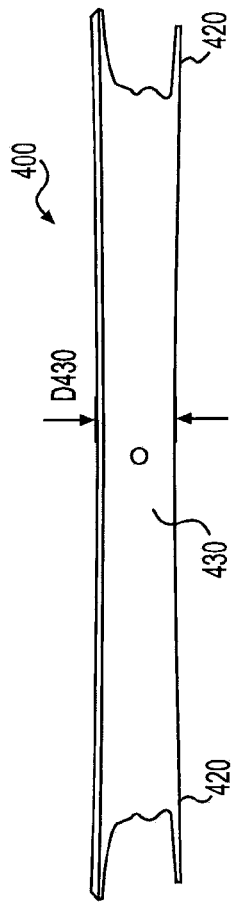
FIG. 4B is a top view of the secondary tube of FIG. 4A.
Figure 4C:
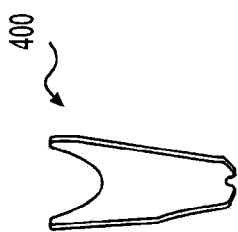
FIG. 4C is a side view of the secondary tube of FIG. 4A.

One of the secondary tubes 300 used in cab frame 100 is now discussed. The other secondary tube 300 used in cab frame 100 may, but need not, be substantially identical. As shown in the figures, secondary tube 300 may be a hollow tube. Contours of secondary tube 300 may be formed by a hydroforming operation. Specifically, during the hydroforming operation, a hollow structure, such as a straight tube that has a constant circular cross section, may be held in a mold, and a pressurized fluid (i.e., liquid or gas) may be flowed through the interior of the hollow structure. The mold may have the contours of secondary tube 300 shown in FIGS. 3A-3C. As a result, the hollow structure may be plastically deformed and may take on the shape of the mold. Through this operation, secondary tube 300 may be formed in a single manufacturing step. The mold may also form one or more openings along the length of secondary tube 300, to permit the fluid to flow out of the hollow interior of secondary tube 300 after the hydroforming operation. It is to be understood, however, that secondary tube 300 may be formed by another manufacturing operation different from the hydroforming operation. For example, as discussed in further detail below, FIGS. 4A-4C show a specific, alternate secondary tube 400 that may be formed by another operation.

Returning to FIGS. 3A-3C, secondary tube 300 may include about horizontally extending portion 330 disposed between two (2) curved portions 320 that are configured to be connected to primary tubes 200 to form cab frame 100. Portion 330 may be about straight. Width W330 of portion 330 may vary (i) from a maximum at the ends that connect to primary tubes 200 through curved portions 320 (ii) to a minimum at an about center of portion 330. Depth D330 of portion 330 may vary (i) from a minimum at the ends that connect to primary tubes 200 through curved portions 320 (ii) to a maximum at an about center of portion 330. Further, specific contours of the extreme ends of curved portions 320 may be prepared to facilitate connection of secondary tube 300 to two (2) primary tubes 200 when forming cab frame 100. As shown in the drawings, the width W330 may be measured in a direction that extends from a top to a bottom edge of portion 330. As also shown in the drawings, the depth D330 may be measured in a direction that extends from a front to a back face of portion 330.

Figure 5:
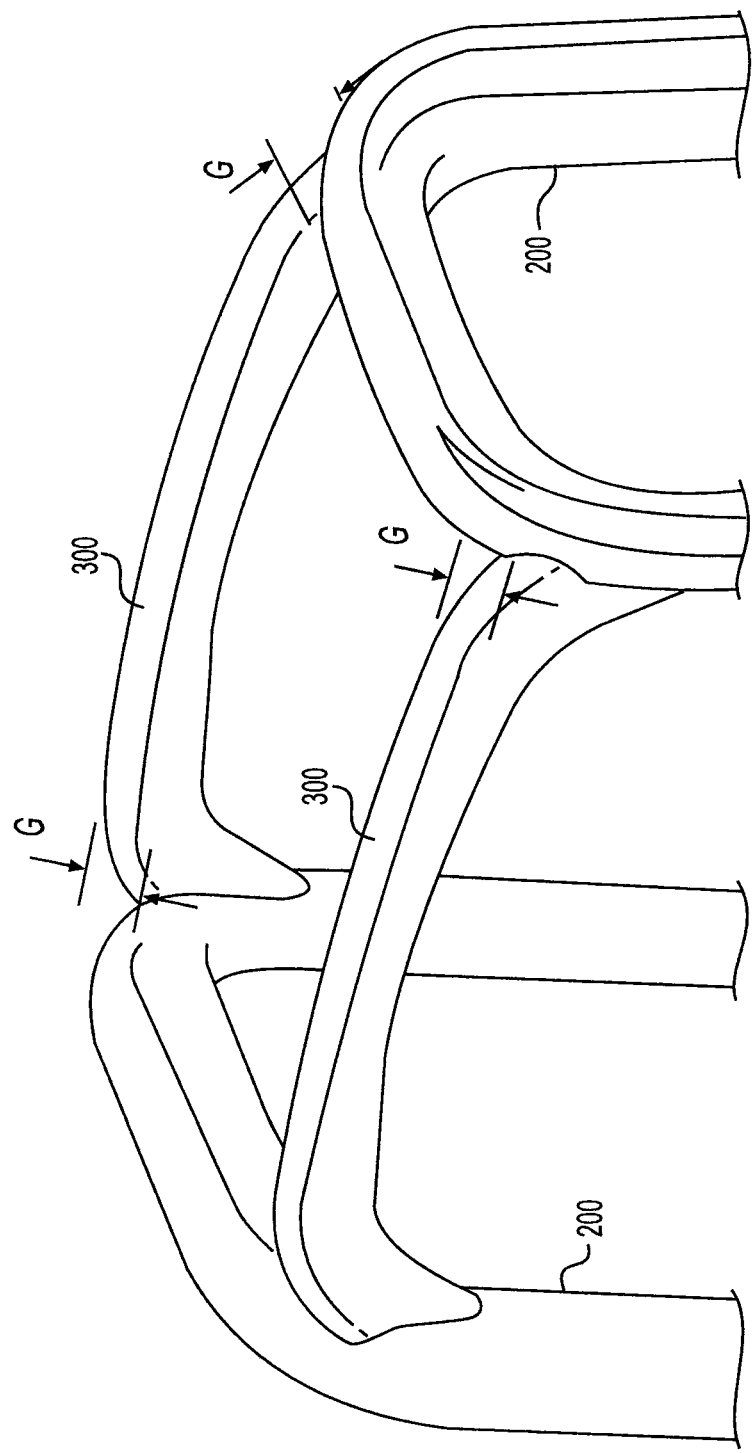
FIG. 5 is a detail view of the cab frame of FIG. 1, showing connections between the primary and secondary tubes.
Figure 6:
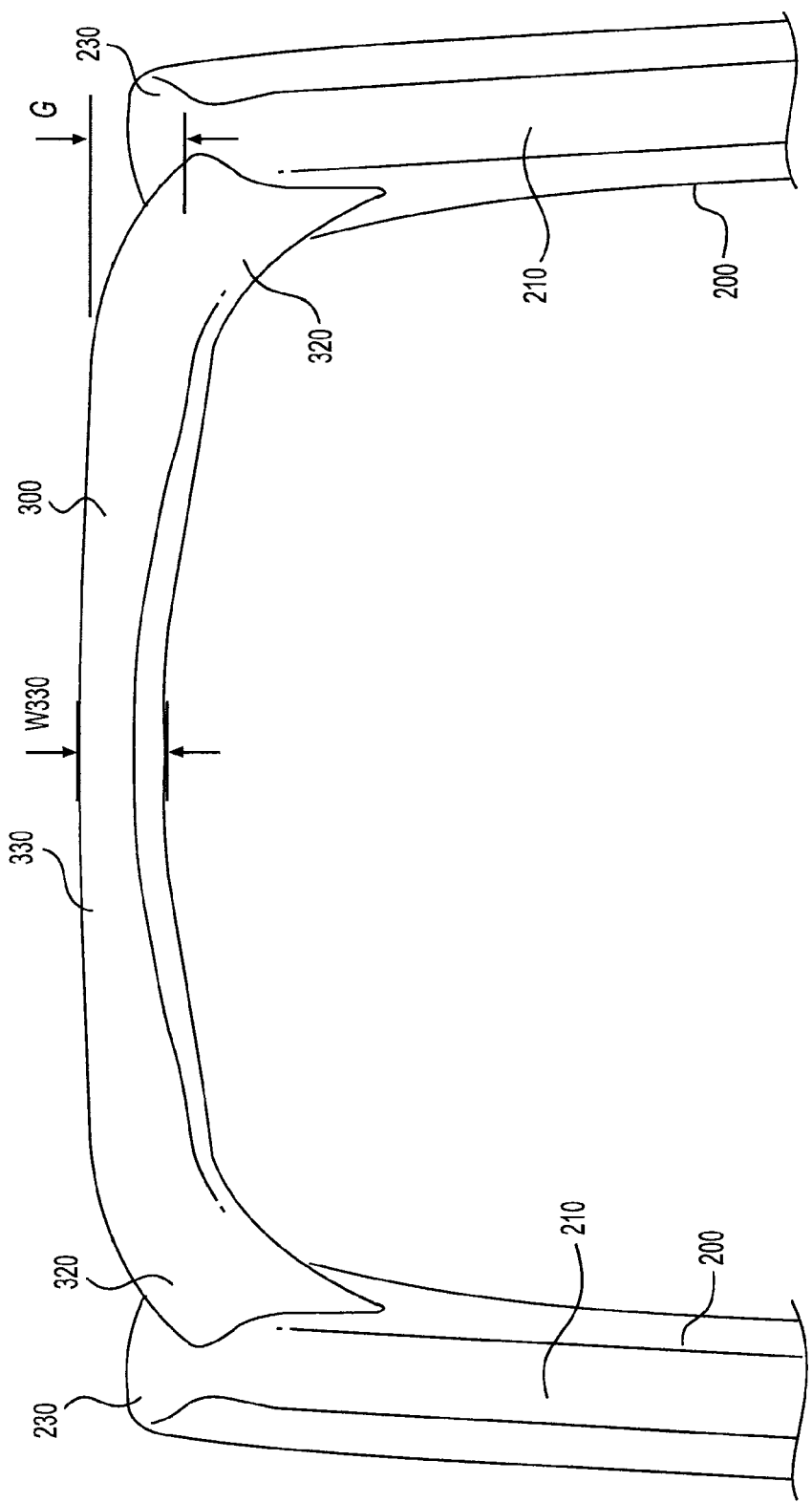
FIG. 6 is a detail view of the cab frame of FIG. 1, similar to FIG. 5 but looking straight toward a front of one of the secondary tubes.

As shown in the figures and as discussed above, cab frame 100 may include two (2) secondary tubes 300. It is contemplated that secondary tubes 300 may be connected to primary tubes 200 such that topmost surfaces of primary and secondary tubes 200 and 300 define a flat plane and define a top of cab frame 100. A roof of the cab may be connected to these topmost surfaces, so as to lie in the flat plane. Further, the contours of curved portions 320 of secondary tubes 300, as well as the contours of curved portions 220 of primary tubes 200, result in gaps between (i) the plane formed by the topmost surfaces of primary and secondary tubes 200 and 300, and (ii) curved portions 220 and 320 of primary and secondary tubes 200 and 300. FIGS. 5 and 6 show examples of these gaps, indicated as gaps G. As shown in the figures, gaps G are formed at corners where secondary tubes 300 are connected to primary tubes 200.

Although FIG. 1 shows cab frame 100 that includes (2) secondary tubes 300 that are illustrated in FIGS. 3A-3C, it is contemplated that other types of secondary tubes may be used in cab frame 100. FIGS. 4A-4C show an example of a specific, alternate secondary tube 400 that may be used in cab frame 100 in place of each of the two (2) secondary tubes 300. It is to be understood, however, that in accordance with the disclosure cab frame 100 may alternately use one (1) secondary tube 300 and one (1) secondary tube 400, or another type of secondary tube with either one (1) secondary tube 300 or one (1) secondary tube 400. It is contemplated that primary tubes 200 and any secondary tubes 400 used in cab frame 100 may be welded to one another. It is to be understood, however, that primary tubes 200 and any secondary tubes 400 used in cab frame 100 may be connected to one another by any other procedure, such as by bolting.

Secondary tube 400 may be formed during one or more blanking operations, stamping operations, material deformation operations, and/or material removal operations. As shown in these figures, secondary tube 400 may include about horizontally extending portion 430 disposed between two (2) curved portions 420 that are configured to be connected to primary tubes 200. Portion 430 may be about straight. Width W430 of portion 430 may vary (i) from a maximum at the ends that connect to primary tubes 200 through curved portions 420 (ii) to a minimum at an about center of portion 430. Depth D430 of portion 430 may vary (i) from a maximum at the ends that connect to primary tubes 200 through curved portions 420 (ii) to a minimum at an about center of portion 430. Further, specific contours of the extreme ends of curved portions 420 may be prepared to facilitate connection to the two (2) primary tubes 200 to form cab frame 100. As shown in the drawings, the width W430 may be measured in a direction that extends from a top to a bottom edge of portion 430. As also shown in the drawings, the depth D430 may be measured in a direction that extends from a front to a back face of portion 430.

As discussed above, cab frame 100 may include two (2) secondary tubes 400. It is contemplated that secondary tubes 400 may be connected to primary tubes 200 such that topmost surfaces of primary and secondary tubes 200 and 400 define a flat plane and define the top of cab frame 100. The roof of the cab may be connected to these topmost surfaces, so as to lie in the flat plane. Further, the contours of curved portions 420 of secondary tubes 400, as well as the contours of curved portions 220 of primary tubes 200, result in a gap between (i) the plane formed by the topmost surfaces of primary and secondary tubes 200 and 400, and (ii) curved portions 220 and 420 of primary and secondary tubes 200 and 400. These gaps are similar to gaps G formed by primary and secondary tubes 200 and 300, examples of which are shown in FIGS. 5 and 6.

INDUSTRIAL APPLICABILITY

The foregoing disclosure is directed to a cab frame for a mobile machine. It is contemplated that cab frame 100 may be connected to any type of mobile machine, such as but not limited to an earthmoving machine, an excavation-type machine, a mining machine, or the like, which may be employed for an earthmoving, excavation, mining, or other operation. Such a mobile machine may employ large earthmoving, excavating, drilling, or mining equipment. It is contemplated that cab frame 100 may include an integrated rollover protective structure (ROPS), which may prevent the cab frame and/or any cab-structure connected to the cab frame from being crushed in a rollover.

In accordance with the disclosure, cab frame 100 for a mobile machine may include two (2) primary tubes 200 and two (2) secondary tubes 300. Primary tubes 200 may be substantially identical to one another. Additionally or alternately, secondary tubes 300 may be substantially identical to one another. Thus, the entirety of cab frame 100, which may include an integrated rollover protective structure (ROPS), may be formed by using only these two (2) parts (i.e., only primary and secondary tubes 200 and 300), two (2) times each. This is in contrast to the dozens of tubes that are used in the known cab frame that includes an integrated ROPS. Thus, cab frame 100 may be much less complex than the known cab frame, may be much less labor-intensive to produce, and may be manufactured less expensively and/or in a shorter period of time.

As discussed above, primary tube 200 may be formed by a hydroforming operation. Thus, primary tube 200 may be provided with one or more desired, specific characteristics and yet be produced by a single manufacturing operation. These characteristics may include desired, specific contours for primary tube 200, which may facilitate or enable connection of primary tube 200 to the mobile machine, connection of primary tube 200 to secondary tubes (such as secondary tubes 300 or 400), or connection of primary tube 200 to other cab-structure components.

These characteristics may additionally or alternately include a desired, specific interior and/or exterior cross-section or another dimension for any particular portion of primary tube 200, which may differ from a cross-section or corresponding dimension of another portion of primary tube 200. The interior and exterior cross-sections and dimensions of a portion of the tube may be related to the strength of that particular portion of the tube. Thus, for example, the width W210 and the depth D210 of portion 210 of primary tube 200 may be chosen to provide a desired, specific strength for portion 210. Further, the width W230 and the depth D230 of portion 230 of primary tube 200 may be different from the width W210 and the depth D210 of portion 210, respectively, and may be chosen to provide a desired, specific strength for portion 230. The strength of portion 230 may be different than or the same as the strength of portion 210. Therefore, primary tube 200 may be provided with a desired, specific strength profile for different portions (e.g., portion 210, 220, or 230) of primary tube 200.

Similarly, the dimensions, such as the depths and the widths, may be varied along a length of a particular portion of primary tube 200. As a result, a desired, minimum strength along the length of that particular portion of primary tube 200 may be maintained even though the dimensions vary along the length of that same portion. Additionally or alternately, a desired, specific strength profile along the length of that particular portion of primary tube 200 may be provided even though the dimensions vary along the length of that same portion. In any case, the dimensions along the length of that particular portion of primary tube 200 may be optimized. Thus, as shown in the figures, such as FIGS. 1, 2A-2C, and 5, the width W230 may be minimized at the center of portion 230 and the depth D230 may be maximized at the center of portion 230, while the desired, minimum strength of portion 230 may be maintained and/or the desired, specific strength profile of portion 230 may be provided. This dimensional optimization may result in a maximization of headroom provided near a center of cab frame 100, and subsequently near the center of the cab connected to cab frame 100, while portion 230 of primary tube 200 may still have adequate strength to resist crushing in the event of a rollover.

As discussed above, secondary tube 300 may be formed by a hydroforming operation. Thus, secondary tube 300 may be provided with one or more desired, specific characteristics and yet be produced by a single manufacturing operation. These characteristics may include desired, specific contours for secondary tube 300, which may facilitate or enable connection of secondary tube 300 to primary tubes 200, or connection of secondary tube 300 to any other cab-structure components.

These characteristics may additionally or alternately include a desired, specific interior and/or exterior cross-section or another dimension for any particular portion of secondary tube 300, which may differ from a cross-section or corresponding dimension of another portion of secondary tube 300. The interior and exterior cross-sections and dimensions of a portion of the tube may be related to the strength of that particular portion of the tube. Thus, secondary tube 300 may be provided with a desired, specific strength profile for different portions (e.g., portion 320 or 330) of secondary tube 300.

Similarly, the dimensions, such as the depths and the widths, may be varied along a length of a particular portion of secondary tube 300. As a result, a desired, minimum strength along the length of that particular portion of secondary tube 300 may be maintained even though the dimensions vary along the length of that same portion. Additionally or alternately, a desired, specific strength profile along the length of that particular portion of secondary tube 300 may be provided even though the dimensions vary along the length of that same portion. In any case, the dimensions along the length of that particular portion of secondary tube 300 may be optimized. Thus, as shown in the figures, such as FIGS. 1, 3A-3C, 5, and 6, the width W330 of portion 330 may be minimized at the center of portion 330 and the depth D330 of portion 330 may be maximized at the center of portion 330, while the desired, minimum strength of portion 330 may be maintained and/or the desired, specific strength profile of portion 330 may be provided. This dimensional optimization may result in a maximization of headroom provided near a center of cab frame 100, and subsequently near the center of the cab connected to cab frame 100, while portion 330 of secondary tube 300 may still have adequate strength to resist crushing in the event of a rollover.

The above-discussed arrangement may result in cab frame 100 with an integrated ROPS which provides different portions having one or more of (i) desired and varying interior and/or exterior cross-section or other dimensions, (ii) desired and varying minimum strength(s), and/or (iii) desired and varying strength profile(s), with only two (2) parts (e.g., only primary and secondary tubes 200 and 300), each used two (2)

times each, with each of the parts being formed in a single manufacturing operation. This is in contrast to the dozens of differently-sized tubes that are used in the known cab frame including an integrated ROPS. Thus, cab frame 100 may be much less complex than the known cab frame, may be much less labor-intensive to produce, and may be manufactured less expensively and/or in a shorter period of time.

As discussed above and as shown in the figures, including FIGS. 1, 5, and 6, secondary tubes 300 may be connected to primary tubes 200 such that topmost surfaces of primary and secondary tubes 200 and 300 define a flat plane and define the top of cab frame 100. The roof of the cab may be connected to these topmost surfaces, so as to lie in the flat plane. Further, the contours of curved portions 320 of secondary tubes 300, as well as the contours of curved portions 220 of primary tubes 200, result in gaps between (i) the plane formed by the topmost surfaces of primary and secondary tubes 200 and 300, and (ii) curved portions 220 and 320 of primary and secondary tubes 200 and 300. These gaps G may provide openings through which electrical harnesses or ducting may be run, in contrast to the known cab frame that includes structurally-necessary gussets to reinforce, and thus which block access to, these areas. It is to be understood that characteristics of primary and secondary tubes 200 and 300, including but not limited to characteristics of curved portions 220 and 320, may be determined such that gaps G are of sufficient size to permit the harnesses and/or the ducts to be disposed therethrough.

In accordance with the disclosure, cab frame 100 for a mobile machine may include two (2) secondary tubes 400 in place of secondary tubes 300. Secondary tubes 400 may be substantially identical to one another. Use of two (2) secondary tubes 400 may be similar to the use of two (2) secondary tubes 300. For example, secondary tube 400 may be provided with one or more desired, specific characteristics. These characteristics may include desired, specific contours for secondary tube 400, which may facilitate or enable connection of secondary tube 400 to primary tubes 200, or connection of secondary tube 400 to any other cab-structure components. These characteristics may additionally or alternately include a desired, specific interior and/or exterior cross-section or another dimension for any particular portion of secondary tube 400, which may differ from a cross-section or corresponding dimension of another portion of secondary tube 400. The interior and exterior cross-sections and dimensions of a portion of the tube may be related to the strength of that particular portion of the tube. Thus, secondary tube 400 may be provided with a desired, specific strength profile for different portions of secondary tube 400.

Similarly, the dimensions, such as the depths and the widths, may be varied along a length of a particular portion of secondary tube 400. As a result, a desired, minimum strength along the length of that particular portion of secondary tube 400 may be maintained even though the dimensions vary along the length of that same portion. Additionally or alternately, a desired, specific strength profile along the length of that particular portion of secondary tube 400 may be provided even though the dimensions vary along the length of that same portion. In any case, the dimensions along the length of that particular portion of secondary tube 400 may be optimized. Thus, as shown in the figures, such as FIGS. 4A-4C, the width W430 of portion 430 may be minimized at the center of portion 430 and the depth D430 of portion 430 may be minimized at the center of portion 430, while the desired, minimum strength of portion 430 may be maintained and/or the desired, specific strength profile of portion 430 may be provided. This dimensional optimization may result in a maximization of headroom provided near a center of cab frame 100, and subsequently near the center of the cab connected to cab frame 100, while portion 430 of secondary tube 400 may still have adequate strength to resist crushing in the event of a rollover.

Similar to secondary tubes 300, secondary tubes 400 may be connected to primary tubes 200 such that topmost surfaces of primary and secondary tubes 200 and 400 define a flat plane and define the top of cab frame 100. The roof of the cab may be connected to these topmost surfaces, so as to lie in the flat plane. Further, the contours of curved portions 420 of secondary tubes 400, as well as the contours of curved portions 220 of primary tubes 200, result in gaps between (i) the plane formed by the topmost surfaces of primary and secondary tubes 200 and 400, and (ii) curved portions 220 and 420 of primary and secondary tubes 200 and 400. These gaps may provide openings through which electrical harnesses or ducting may be run. It is to be understood that characteristics of primary and secondary tubes 200 and 400 may be determined to provide gaps of a desired, sufficient size to permit the harnesses and/or the ducting to be disposed therethrough.

In further accordance with the disclosure, for one or both of the primary tubes 200, each surface 215 of the two (2) portions 210, as well as surface 225 of portion 220 and surface 235 of portion 230, may be an about flat surface, and may lie in the same flat plane. Thus, primary tube 200 may provide a single flat surface to be used as a door sealing surface, which is formed during the same manufacturing operation (i.e., the hydroforming operation). Therefore, primary tube 200 may provide an improved door sealing surface as compared to the known cab frame in which a door sealing surface is assembled from a number of once-separate component parts that are subsequently welded together.

In still further accordance with the disclosure, surface 217 of each of the two (2) portions 210 may include holes 219 formed during manufacture of primary tube 200, which may be configured to receive fasteners for connection of door hinges to primary tube 200. Thus, doors can be connected to either side of primary tube 200, regardless of whether primary tube 200 is on the left side or the right side of cab frame 100. Unlike the case with the known cab frame, holes for connection of door hinges need not be formed during a separate operation, such as during assembly of cab frame 100. Thus, manufacture of the cab built on cab frame 100 is simplified as compared to the manufacture of the cab on the known cab frame.

Although the dimensions of primary tube 200 and secondary tubes 300 and 400 may be measured relative to edges and faces of the tubes 200, 300, and 400, as set forth above, it is to be understood that the dimensions, including the widths and the depths, may be measured at least in part relative to cab frame 100 when assembled to include two (2) primary tubes 200 and either two (2) secondary tubes 300 or two (2) secondary tubes 400. For example, the width W210 may be measured about parallel to the plane in which uppermost portions of primary tubes 200, secondary tubes 300, and/or secondary tubes 400 are disposed, and about across a front face of portion 210. The depth D210 may be measured about parallel to the plane, and about perpendicular to the width W210. The width W230 may be measured about perpendicular to the plane, and about across a front face of portion 230. The depth D230 may be measured about parallel to the plane, and about perpendicular to the width W230. The width W330 may be measured about perpendicular to the plane, and about across a front face of portion 330. The depth D330 may be measured about parallel to the plane, and about perpendicular to the width W330. The width W430 may be measured about perpendicular to the plane, and about across a front face of portion 430. The depth D430 may be measured about parallel to the plane, and about perpendicular to the width W430.

Other characteristics of primary tube 200 may be chosen to achieve other advantages. For example, shapes or contours of one or both of portions 210, for one or both of primary tubes 200, may be chosen to increase or maximize operator visibility in an area surrounding the mobile machine and/or the cab constructed on cab frame 100, when the operator is in the cab or cab frame 100.

It is to be understood that this disclosure may be used with a cab frame that does not include a ROPS, or with cab frames having different ROPS requirements. Depending on whether the cab frame does not include a ROPS requirement, or whether the cab frame has a less stringent ROPS requirement, for example, tubes having different characteristics may be used to form one or both of primary tubes 200, and/or one or both of secondary tubes 300. By way of further example, tubes having thinner walls may be used when there is no ROPS requirement or a reduced ROPS requirement for the cab frame.

It will be apparent to those skilled in the art that various modifications and variations may be made to the cab frame for the mobile machine without departing from the scope of the disclosure. Other embodiments of the disclosed cab frame will be apparent to those skilled in the art from consideration of the specification and practice of the cab frame disclosed herein. It is intended that the specification and examples be considered as exemplary only, with a true scope of the disclosure being indicated by the following claims and their equivalents.

What is claimed is:

1. A frame for a cab of a mobile machine, the cab frame comprising:
    a first primary tube comprising first and second about vertically extending portions and an about horizontally extending portion, the about vertically extending portions configured to be connected to the mobile machine, and the about horizontally extending portion disposed between the about vertically extending portions, the first primary tube being formed by hydroforming;
    a second primary tube comprising first and second about vertically extending portions and an about horizontally extending portion, the about vertically extending portions of the second primary tube configured to be connected to the mobile machine, and the about horizontally extending portion of the second primary tube disposed between the about vertically extending portions of the second primary tube, the second primary tube being formed by hydroforming; and
    first and second secondary tubes, each of the first and second secondary tubes connecting to the first and second primary tubes,
    wherein the first secondary tube has a minimum value of a width at an about center thereof and has a maximum value of a depth at the about center thereof, the width of the first secondary tube measured about perpendicular to a plane and the depth of the first secondary tube measured about parallel to the plane, the plane defined by uppermost surfaces of the about horizontally extending portions of the first and second primary tubes, the maximum value being greater than the minimum value.

2. The cab frame of claim 1, wherein the first about vertically extending portion of the first primary tube has a first width and a first depth, and the about horizontally extending portion of the first primary tube has a second width that is different that the first width and has a second depth that is different that the first depth.

3. The cab frame of claim 2, wherein the first secondary tube has a first width and a first depth each at a first portion thereof, and the first secondary tube has a second width and a second depth each at a second portion thereof, the second width being different from the first width, and the second depth being different from the first depth.

4. The cab frame of claim 1, wherein the first and second secondary tubes are connected to the first and second primary tubes such that uppermost surfaces of the secondary tubes are disposed in a same plane as uppermost surfaces of the about horizontally extending portions of the first and second primary tubes.

5. The cab frame of claim 4, wherein uppermost surfaces of ends of the about horizontally extending portion of the first primary tube are disposed below the plane.

6. The cab frame of claim 5, wherein uppermost surfaces of ends of the first secondary tube are disposed below the plane.

7. The cab frame of claim 6, wherein the first secondary tube is formed by hydroforming.

8. The cab frame of claim 1, wherein the about horizontally extending portion of the first primary tube has a minimum value of a width at an about center thereof, the width measured about perpendicular to the plane.

9. The cab frame of claim 8, wherein the about horizontally extending portion of the first primary tube has a maximum value of a depth at the about center thereof, the depth measured about parallel to the plane.

10. The cab frame of claim 1, wherein the first secondary tube is formed by hydroforming.

11. The cab frame of claim 1, wherein (i) a surface of the first about vertically extending portion of the first primary tube, (ii) a surface of the second about vertically extending portion of the first primary tube, and (iii) a surface of the about horizontally extending portion of the first primary tube are disposed in a same plane, the plane configured to provide a sealing surface for a door connected to the cab frame.

12. A frame for a cab of a mobile machine, the cab frame comprising:
    a first primary tube comprising first and second about vertically extending portions and an about horizontally extending portion disposed therebetween, the first primary tube having different strengths along a length thereof and forming a left side of the cab frame, the first primary tube being formed by hydroforming;
    a second primary tube comprising first and second about vertically extending portions and an about horizontally extending portion disposed therebetween, the second primary tube having different strengths along a length thereof and forming a right side of the cab frame, the second primary tube being formed by hydroforming; and
    first and second secondary tubes, the first secondary tube connected to the primary tubes to form a front of the cab frame, and the second secondary tube connected to the primary tubes to form a back of the cab frame,
    wherein a minimum strength is maintained along a length of at least one of the first and second secondary tubes, even though dimensions vary along the length.

13. The cab frame of claim 12, wherein the about horizontally extending portion of the first primary tube has a minimum value of a width at an about center thereof and has a maximum value of a depth at the about center thereof, the width measured about perpendicular to a plane defined by uppermost surfaces of the about horizontally extending portions of the first and second primary tubes, and the depth measured about parallel to the plane.

14. The cab frame of claim 13, wherein the first secondary tube has a minimum value of a width at an about center thereof and has a maximum value of a depth at the about center thereof, the width of the first secondary tube measured about perpendicular to the plane and the depth of the first secondary tube measured about parallel to the plane.

15. A method of manufacturing a frame for a cab of a mobile machine, the method comprising:
    forming a first primary tube by a hydroforming operation, the first primary tube configured to form a left side of the cab frame;
    forming a second primary tube by a hydroforming operation, the second primary tube configured to form a right side of the cab frame;
    forming first and second secondary tubes; and
    connecting each of the first and second secondary tubes to both of the first and second primary tubes,
    wherein the first secondary tube has a minimum value of a width at an about center thereof and to include a maximum value of a depth at the about center thereof, the width of the first secondary tube measured about parallel to a plane defined by uppermost surfaces of about horizontally extending portions of the first and second primary tubes, the maximum value being greater than the minimum value.

16. The method of claim 15, wherein forming the first primary tube comprises forming the first primary tube to include first and second about vertically extending portions and the about horizontally extending portion, the about vertically extending portions configured to be connected to the mobile machine, and the about horizontally extending portion disposed between the about vertically extending portions, the first primary tube having different strengths along a length thereof, and
    wherein forming the second primary tube comprises forming the second primary tube to include first and second about vertically extending portions and the about horizontally extending portion, the about vertically extending portions of the second primary tube configured to be connected to the mobile machine, and the about horizontally extending portion of the second primary tube disposed between the about vertically extending portions of the second primary tube.

17. The method of claim 16, wherein connecting comprises connecting the secondary tubes such that uppermost surfaces of the about horizontally extending portions of the first and second primary tubes and uppermost surfaces of the secondary tubes are disposed in a same plane, and
    wherein the about horizontally extending portion of the first primary tube has a minimum value of a width at an about center thereof and has a maximum value of a depth at the about center thereof, the width measured about perpendicular to the plane and the depth measured about parallel to the plane.

18. The method of claim 15, wherein forming the first and second secondary tubes comprises forming the first secondary tube by a hydroforming operation, and
    wherein connecting comprises welding the secondary tubes to the primary tubes.

* * * * *